(12) United States Patent
Siegemund et al.

(10) Patent No.: US 8,661,407 B2
(45) Date of Patent: Feb. 25, 2014

(54) FRAMEWORK FOR PROGRAMMING EMBEDDED SYSTEM APPLICATIONS

(75) Inventors: Frank Siegemund, Bellevue, WA (US); Alain Gefflaut, Herzogenrath (DE); Matthias Neugebauer, Aachen (DE)

(73) Assignee: Microsoft Corporation, Redmond, WA (US)

( * ) Notice: Subject to any disclaimer, the term of this patent is extended or adjusted under 35 U.S.C. 154(b) by 1318 days.

(21) Appl. No.: 12/146,819

(22) Filed: Jun. 26, 2008

(65) Prior Publication Data

US 2009/0327996 A1 Dec. 31, 2009

(51) Int. Cl.
*G06F 9/44* (2006.01)

(52) U.S. Cl.
USPC .......................................... 717/108

(58) Field of Classification Search
USPC ................................. 717/106–109
See application file for complete search history.

(56) References Cited

U.S. PATENT DOCUMENTS

| | | | | |
|---|---|---|---|---|
| 6,247,174 B1 * | 6/2001 | Santhanam et al. | ........... | 717/154 |
| 6,851,118 B1 * | 2/2005 | Ismael et al. | .................. | 719/330 |
| 6,865,732 B1 * | 3/2005 | Morgan | ........................ | 717/140 |
| 6,886,157 B2 * | 4/2005 | Long et al. | ..................... | 717/151 |
| 6,901,588 B1 * | 5/2005 | Krapf et al. | .................... | 717/164 |
| 7,246,346 B2 * | 7/2007 | Demsey et al. | ................ | 717/147 |
| 7,320,129 B2 * | 1/2008 | Talwar et al. | ..................... | 718/1 |
| 7,434,209 B2 * | 10/2008 | Brown et al. | ................. | 717/136 |
| 7,472,380 B1 * | 12/2008 | Rao et al. | ....................... | 717/140 |
| 7,580,990 B1 * | 8/2009 | Spring | ........................... | 709/219 |
| 7,669,197 B1 * | 2/2010 | O'Neill et al. | ................ | 717/172 |
| 7,921,206 B2 * | 4/2011 | Nagaraja et al. | .............. | 709/224 |
| 2004/0172620 A1 * | 9/2004 | Perez | ............................ | 717/118 |
| 2005/0034109 A1 * | 2/2005 | Hamilton et al. | ............. | 717/140 |
| 2005/0044540 A1 * | 2/2005 | Savov | ............................ | 717/166 |
| 2006/0190933 A1 * | 8/2006 | Tzeng | ........................... | 717/140 |
| 2006/0259902 A1 * | 11/2006 | Lin | ................................. | 717/168 |
| 2007/0115818 A1 * | 5/2007 | Bose | ............................. | 370/230 |
| 2008/0163265 A1 * | 7/2008 | Flora | ............................. | 719/328 |
| 2009/0172657 A1 * | 7/2009 | Makelainen et al. | ......... | 717/174 |
| 2009/0217245 A1 * | 8/2009 | Iyer et al. | ....................... | 717/126 |
| 2009/0241090 A1 * | 9/2009 | Anlauff et al. | ................ | 717/114 |

* cited by examiner

*Primary Examiner* — Anna Deng
(74) *Attorney, Agent, or Firm* — Pablo Tapia; Micky Minhas; Zete Law, P.L.L.C.

(57) ABSTRACT

The disclosure describes a method for programming applications for embedded systems such as sensor nodes. In an embodiment, this comprises writing embedded system applications in a high-level language such as C# or Java using a software development framework which includes a set of tools and class libraries. The class libraries contain pre-written code to carry out tasks which may be required of an embedded system. The class libraries may be extended following identification of a need for a particular function in an embedded system. Developed applications may be subsequently stored on the embedded system but executed on a gateway computing device which interacts with the embedded system. This means that the application(s) can be executed without requiring the presence of a virtual execution system located on the embedded system while allowing a high-level programming model for application programmers.

13 Claims, 10 Drawing Sheets

FRAMEWORK FOR PROGRAMMING EMBEDDED SYSTEM APPLICATIONS

BACKGROUND

An embedded system is an example of a specialized computer system which may be part of a larger system or machine. Embedded systems usually have limited resources such as memory and processing capability and are programmed with software to carry out one or a limited number of tasks. The software is typically written in low-level languages like C/C++ or domain-specific languages. Programming in these languages requires a specialized skill set. One example of an embedded system is a sensor node. A sensor node has one or more sensors which is/are capable of gathering information about the sensor node's environment. A sensor node may perform basic processing of this information or may supply the information to another computing device which may have greater processing capabilities.

The embodiments described below are not limited to implementations which solve any or all of the disadvantages of known embedded system application programming techniques.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The disclosure describes a method for programming applications for embedded systems such as sensor nodes. In an embodiment, this comprises writing embedded system applications in a high-level language such as C# or Java using a software development framework which includes a set of tools and class libraries. The class libraries contain pre-written code to carry out tasks which may be required of an embedded system. The class libraries may be extended following identification of a need for a particular function in an embedded system. Developed applications may be subsequently stored on the embedded system but executed on a gateway computing device which interacts with the embedded system. This means that the application(s) can be executed without requiring the presence of a virtual execution system located on the embedded system while allowing a high-level programming model for application programmers.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Although the present examples are described and illustrated herein as being implemented in a sensor node, the system described is provided as an example and not a limitation. As those skilled in the art will appreciate, the present examples are suitable for application in a variety of different types of embedded systems. In addition, in the examples below, wireless networks are used. However, the present invention can also apply to embedded systems connected over wired connection such as Ethernet, power line or other networks.

The term 'framework' as used herein refers to a software development aid which provides a code library and a set of tools for guiding the software development process. The term 'embedded system' as used herein refers to hardware components which are dedicated to performing one or limited computing task(s). Embedded systems comprise a memory in which software which allows that or those computing tasks to be carried out is stored. The term 'gateway computing device' is used to refer to a computing device which communicates with embedded systems.

Figure 1:
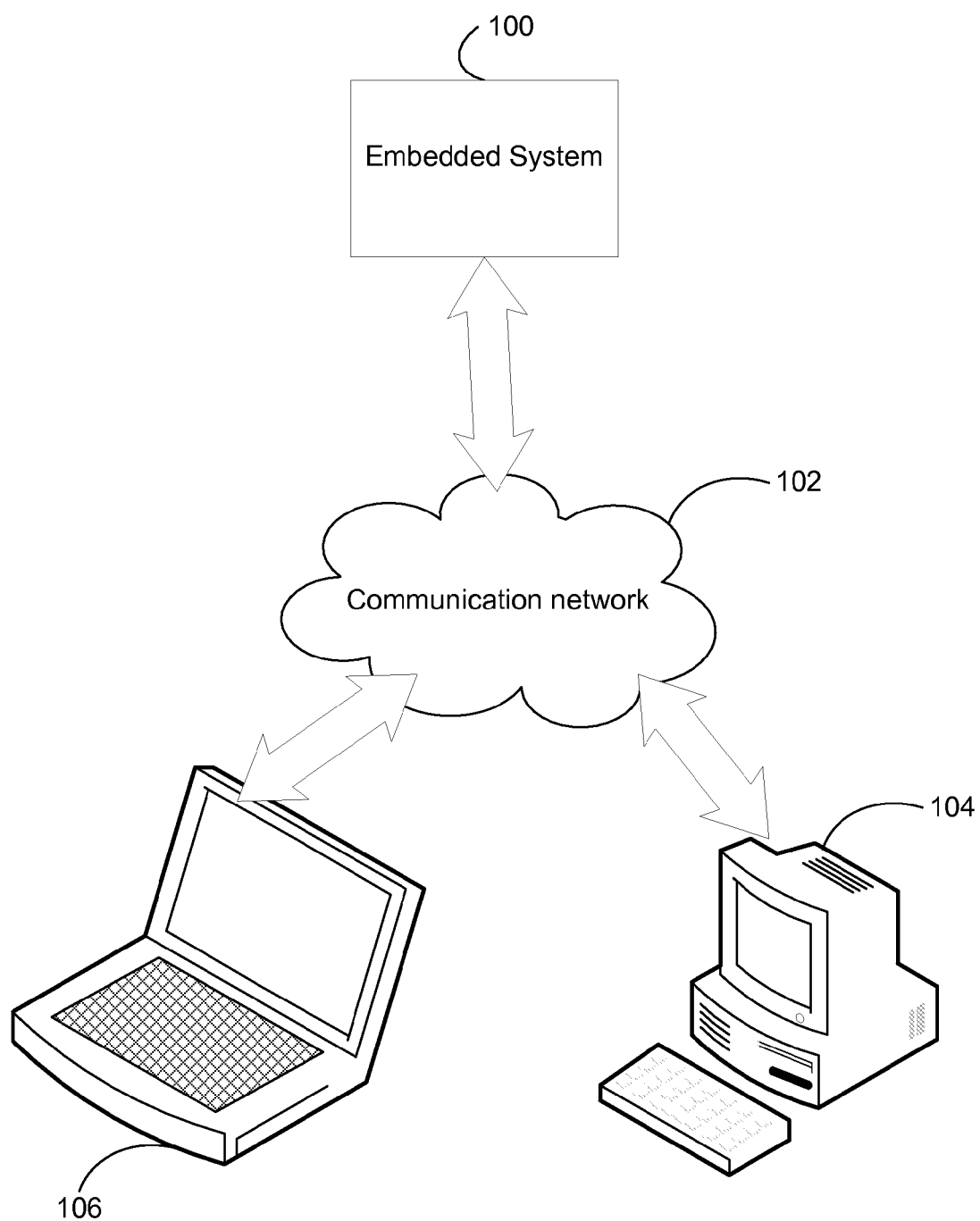
FIG. 1 is a schematic diagram of an embedded system and two computing devices.

FIG. 1 shows an example of an embedded system 100 which is arranged to communicate with a programming computing device 104 and a gateway computing device 106 over a communication network 102. A programmer writes an embedded system software application on the programming computing device 104 and uses the communication network 102 to upload the software application onto the embedded system 100. The embedded system 100 stores a software application which includes instructions to allow the gateway computing device 106 to interact with the embedded system 100. The gateway computing device 106 has access to an execution environment arranged to retrieve then execute the software application. On executing the application, the gateway computing device 106 utilizes the instructions in the software application to interact with the embedded system 100, for example downloading data from the embedded system 100 for processing or controlling the functions of the embedded system 100.

In other examples, programming computing device 104 may also act as a gateway computing device 106, and/or the software application may not be stored on the embedded system 100; the embedded system 100 may, for example, instead supply information over the communication network 102 to the gateway computing device 106 about where the application is located, for example by providing an IP address or the like. A number of different communication networks may be utilized.

The programming computing device 104 has access to a framework, which can be used by a programmer to simplify the development of an embedded system software application. This software application contains all the information necessary to allow the gateway computing device 106 to interact with a specific embedded system 100 and therefore the gateway computing device 106 need not contain any software which is specific to that embedded system 100 ab initio; instead it simply has access to an execution environment arranged to retrieve and execute the software application received. As the software received by the gateway computing device 106 can be executed thereon, it can make use of the capabilities of the gateway computing device 106, which may be superior to the capabilities of the embedded system 100.

Figure 2:
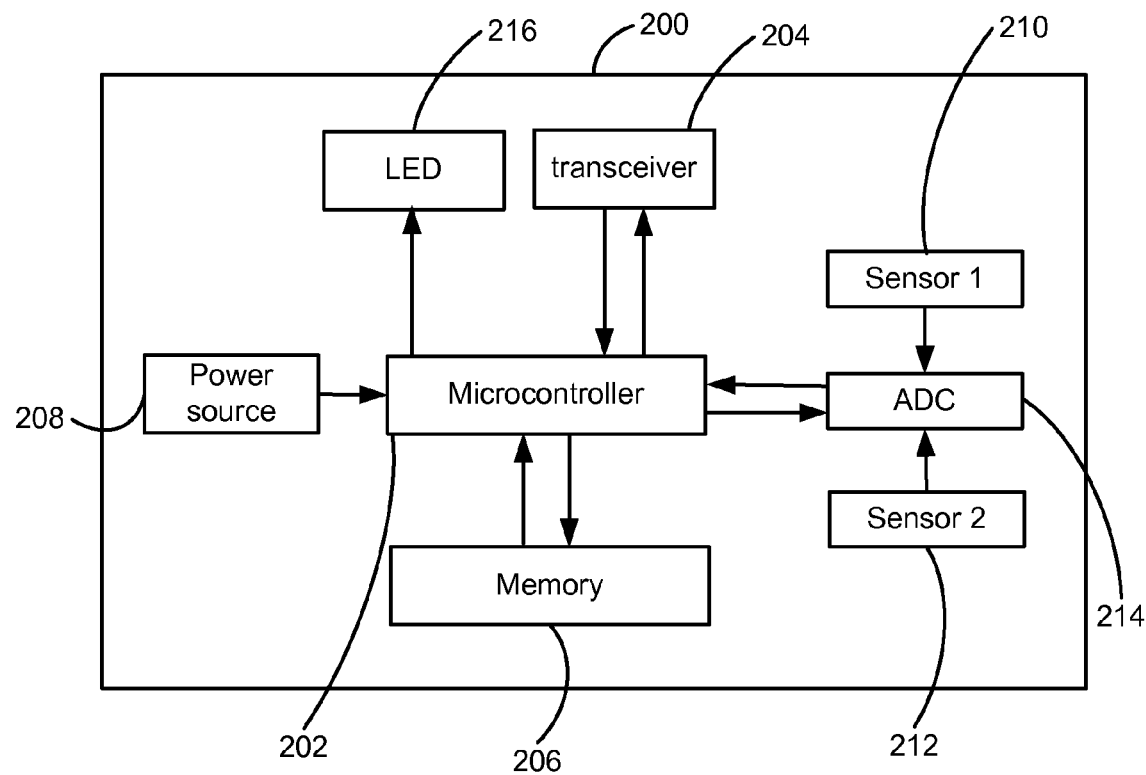
FIG. 2 is a schematic diagram of a sensor node.
Figure 3:
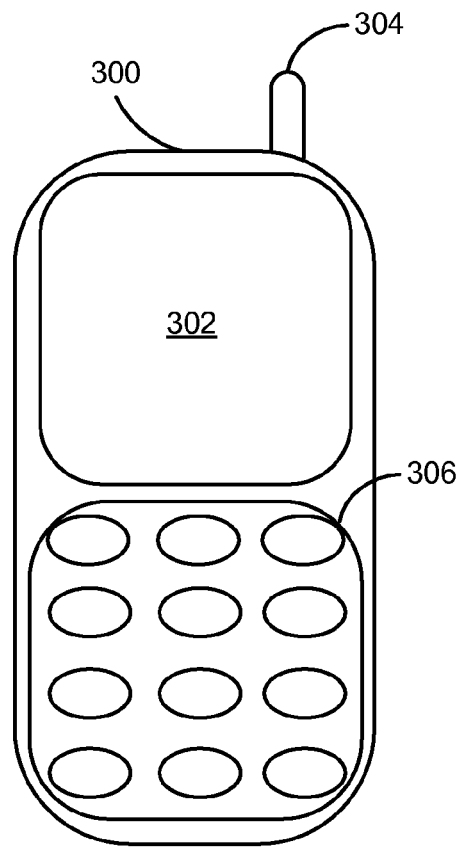
FIG. 3 is a schematic diagram of a gateway computing device capable of communicating with a sensor node.
Figure 5:
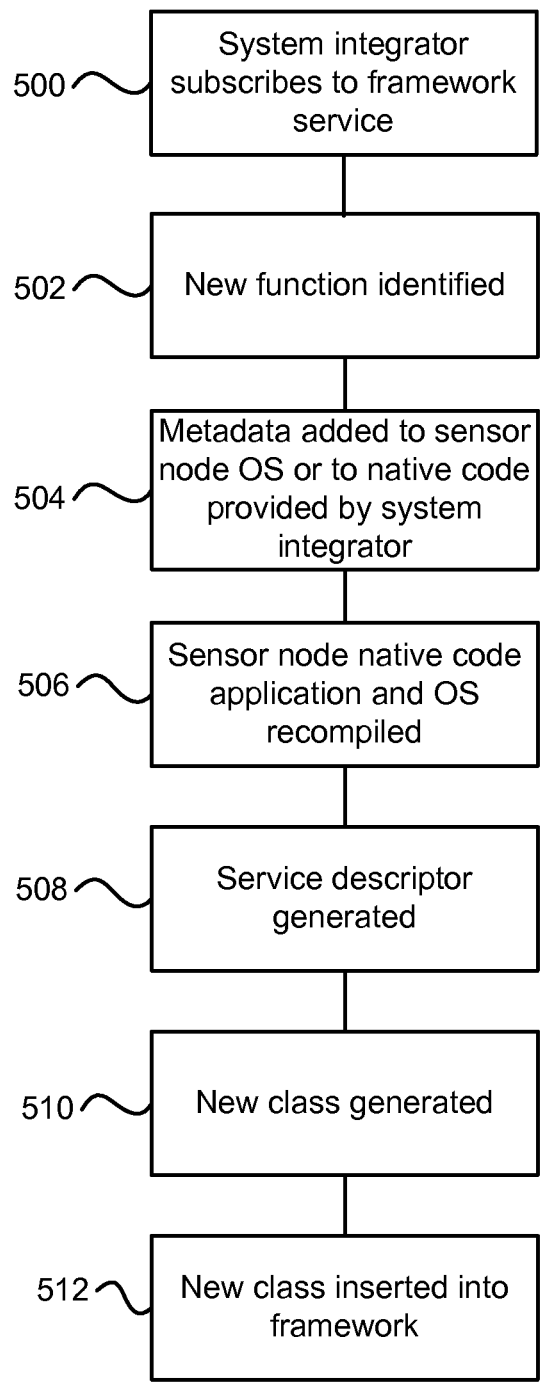
FIG. 5 is a flow diagram of a method of building a new class.
Figure 6:
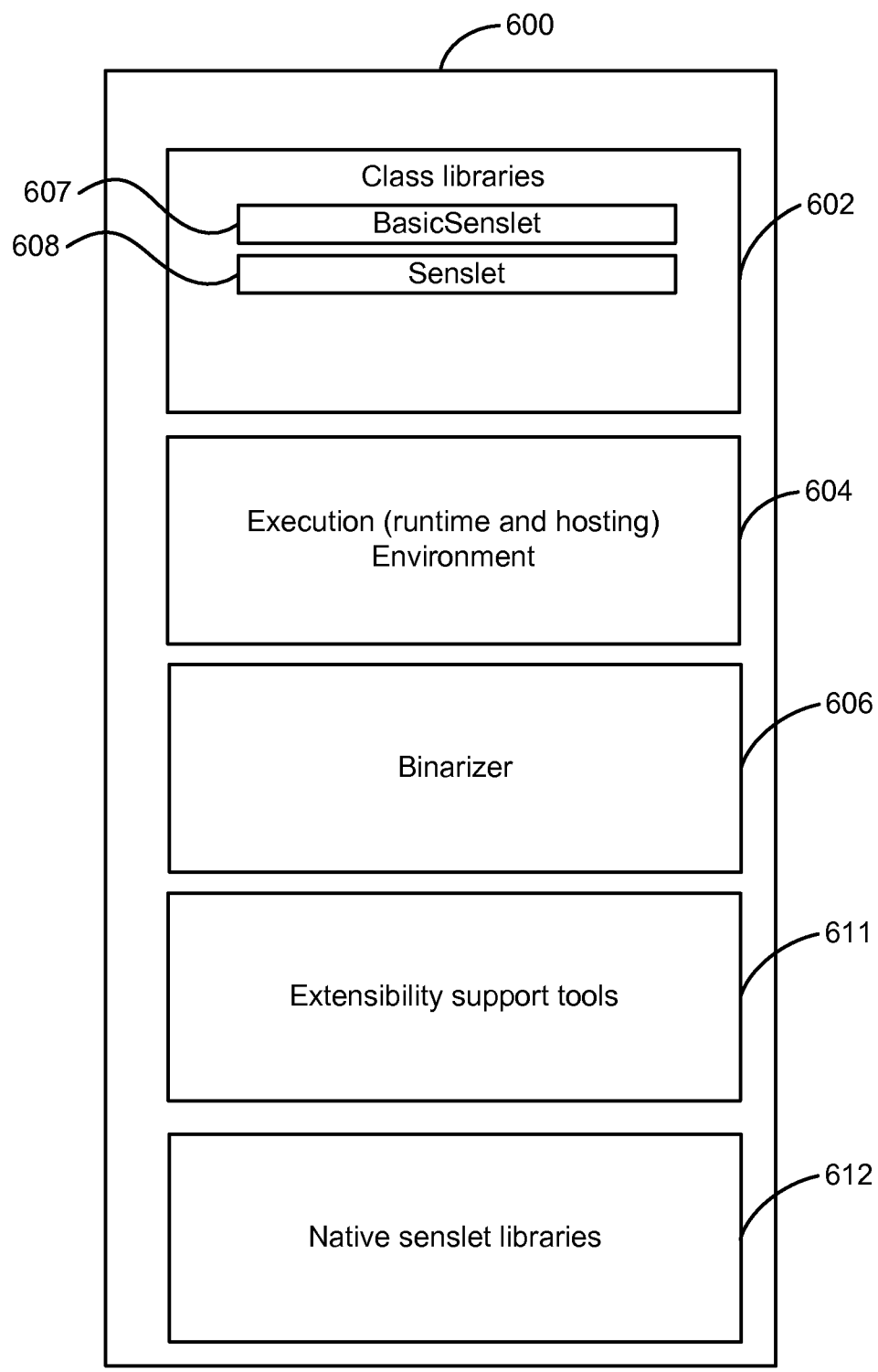
FIG. 6 is a schematic diagram of a framework.
Figure 7:
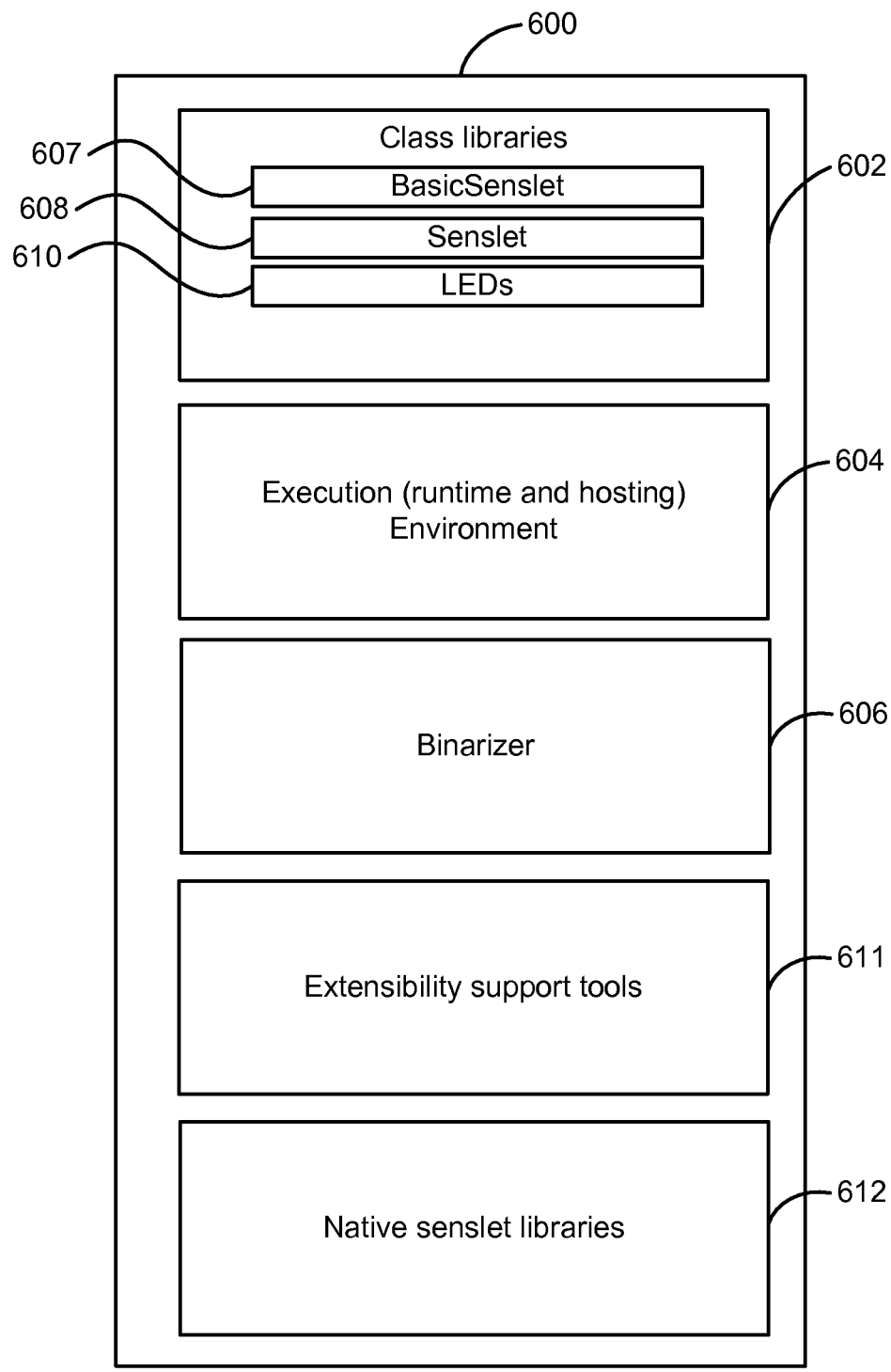
FIG. 7 is a schematic diagram of an updated framework.
Figure 8:
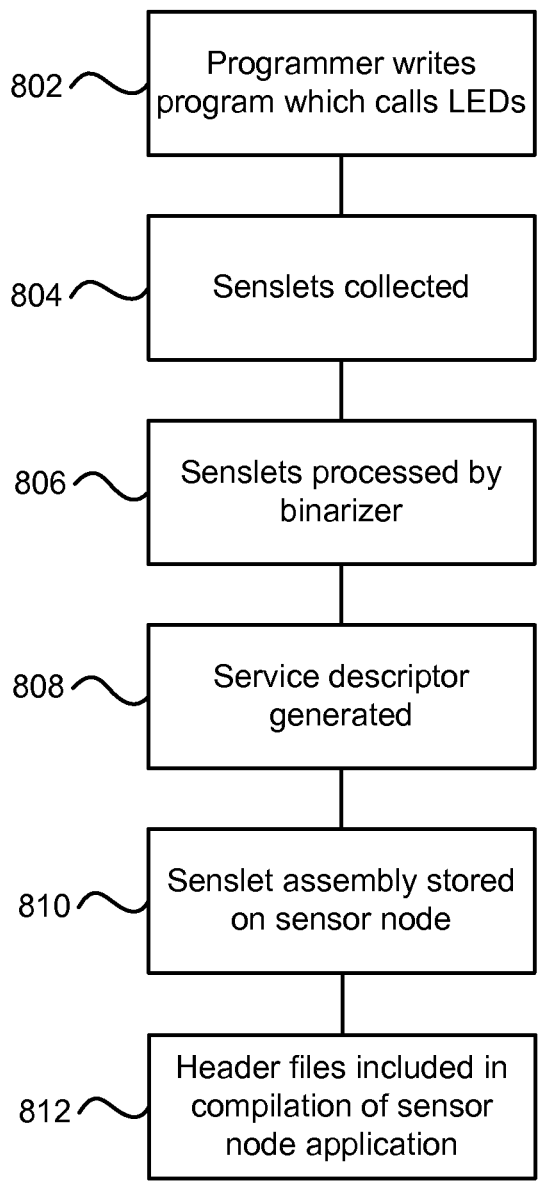
FIG. 8 is a flow diagram of a method of programming a sensor node.
Figure 9:
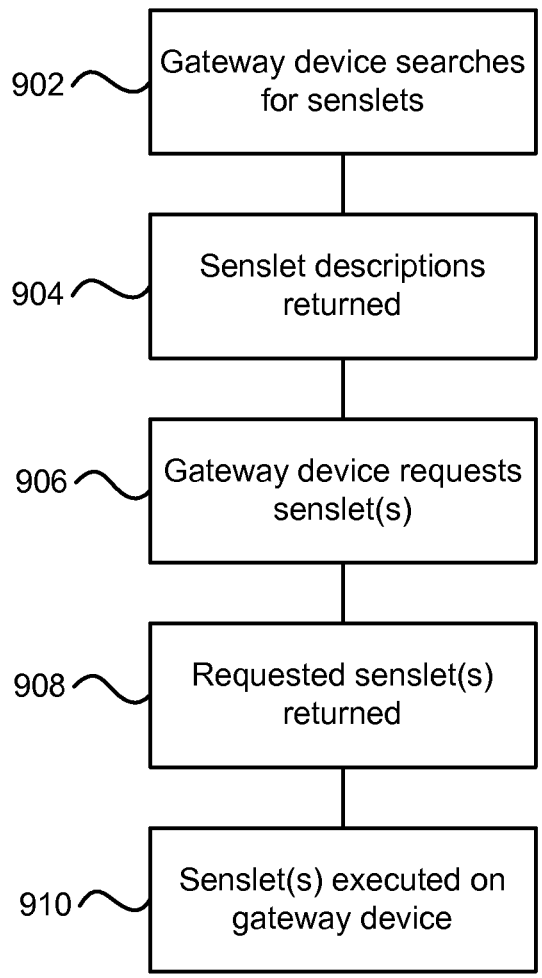
FIG. 9 is a flow diagram of a method of executing an embedded system application.
Figure 10:
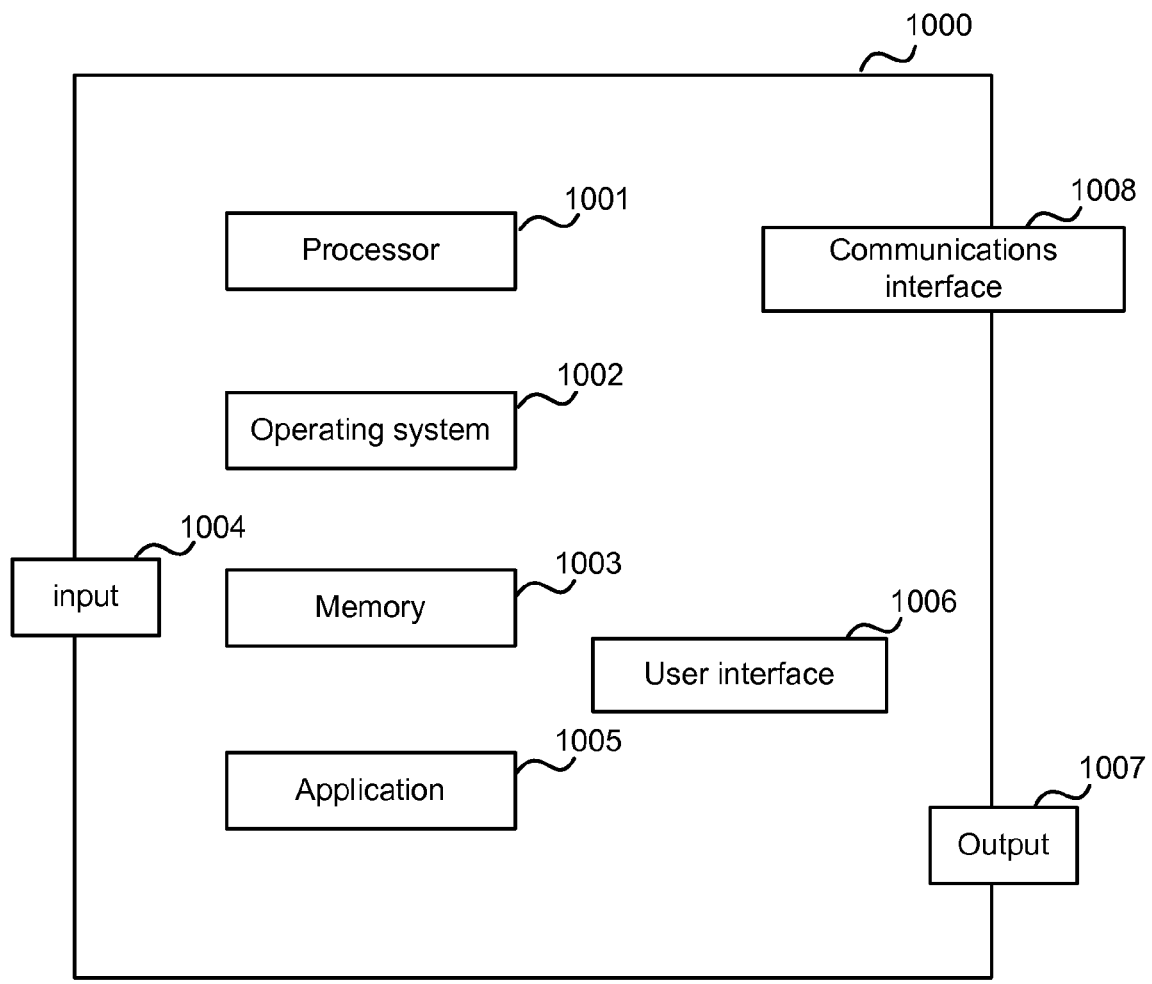
FIG. 10 illustrates an exemplary computing-based device in which embodiments of computing devices may be implemented.

An example of an embedded system 100 is shown in FIG. 2 and examples of computing devices are shown in FIGS. 3 and 10. Processes of writing an embedded system software application using a framework are described in FIGS. 4 and 8. FIG. 5 outlines an example of a method for extending a framework and a representation of the framework available on the programming computing device 104 is shown in FIGS. 6 and 7. FIG. 9 shows an example of the process of executing an embedded system application on a gateway computing device 106.

The disclosure describes examples of methods and tools for exposing a high-level programming model for embedded system applications, and examples of methods for system integrators to access and extend a programming framework.

FIG. 2 shows an example of an embedded system 100 comprising a sensor node 200. The sensor node 200 comprises a microcontroller 202, transceiver 204, memory 206, a power source 208, two sensors 210, 212, an Analog to Digital Converter (ADC) 214 and a red LED 216. In this example, sensors 210, 212 are connected to the processor of the sensor nodes via an ADC 214, but in other examples, other interfaces such as I2C or serial interfaces could be used for the same purpose.

In this example, the microcontroller 202 operates TinyOS. As will be familiar to the skilled person, TinyOS is an open source embedded operating system and platform for wireless sensor networks. TinyOS is written in the nesC (Network Embedded Systems C) programming language, which is an extension of the programming language C. TinyOS is a popular OS for sensor nodes and other embedded systems 100 but other examples may employ a different OS or employ a scheduler. In other examples, the sensor node 200 may run applications using a model that does not rely on an OS or a scheduler.

FIG. 3 shows a mobile phone 300 which is arranged to act as a gateway computing device 106. The mobile phone 300 comprises a screen 302, a transceiver aerial 304 which allows the mobile phone 300 to send radio transmissions using Global Systems for Mobile communications (GSM), and a keypad 306. The mobile phone 300 in this example is arranged to communicate with the sensor node 200 using the Bluetooth® protocol. The mobile phone 300 is also arranged to provide a runtime (execution) environment for embedded system applications in the form of a browser.

In other examples, other computing-based devices may act as a gateway computing device 106, for example, Personal Digital Assistants, laptop or notebook computers, PCs, servers, or the like. Gateway computing devices 106 may communicate with embedded systems 100 using any wired or wireless communication interfaces, such as IEEE 802.15.4, Zigbee, IEEE 802.11 or Ethernet. It is also possible that a backend computing device such as a server runs a browser which is capable of interacting with embedded systems 100 and which provides an execution (runtime and hosting) environment for applications which may have been developed using the framework described below. A gateway computing device 106 may forward communication packets from one or multiple embedded systems 100 to the backend computing device.

The sensor node 200 is a resource-constrained device of the type where applications are typically implemented using low-level languages such as C/C++ or domain-specific languages. However, in the example now described, the sensor node software applications are programmed in a high-level language such as C# or Java, which will be more readily understood by programmers, and which is arranged to be executed on a gateway computing device 106 such as the mobile phone 300. Therefore, the sensor node 200 does not require a resource-hungry virtual execution system. For the programmer, the use of a high-level language may offer an improved development experience. In addition, the method may make use of a framework including class libraries and a set of tools to further simplify the programming process.

A process of writing an application for the sensor node 200 using class libraries and a set of provided tools is now described with reference to the flow diagram of FIG. 4 and the framework 600 shown in FIG. 6. Such a sensor node application, developed with a high-level programming language, is termed a 'senslet' herein. As with an applet, a senslet is designed to be executed from within an execution environment, which in the example now described is provided by a gateway computing device 106. Rather than executed directly by the TinyOS operating system of the sensor node 200, the senslet in this example is instead executed in the execution environment on the mobile phone 300 and can utilize the resources of the mobile phone 300, such as its screen 302 and its network or processing capabilities.

In some examples described below, system integrators expose functionalities of embedded systems 100 by flagging functions in native code with metadata. This functionality is then exposed as one or more services, and classes in a high-level language are generated automatically for accessing this functionality from within the programming framework. This allows the framework to be developed and new embedded system application assemblies in a high-level language to be generated.

Figure 4:
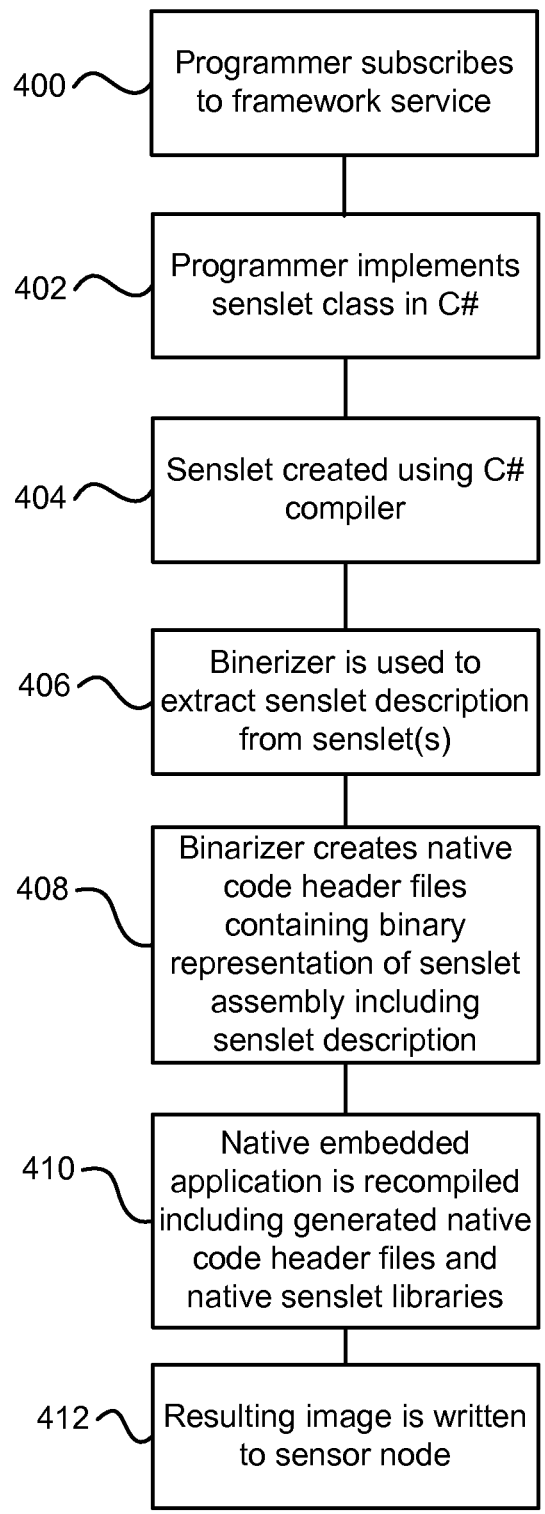
FIG. 4 shows a process of implementing an embedded system application in a high-level language.

With reference to FIG. 4, in order to develop the senslet, a programmer subscribes to a software framework (block 400). This subscription may be, for example, a license to access the framework or may be a license to use software, or some other form of subscription. An example of a framework 600 is shown schematically in FIG. 6 and is housed on a programming computing device 104 such as the device 1000 shown in FIG. 10. This may be a server, for example, which the programmer can connect to via the internet or the like. In other examples, the framework 600 may be provided on a programmer's personal computer and the subscription may comprise use of the software providing the framework 600, and in some examples receiving updates to the framework 600 when these are available. As will be familiar to the skilled person, software frameworks 600 aid software development by providing a code library and a set of tools for guiding the software development process.

In this example, the framework 600 is based on the NET framework provided by Microsoft® and is specific to senslets. The framework 600 comprises a set of pre-coded solutions to known computing problems which are stored in managed class libraries 602, for example .NET class libraries. As with existing class libraries, they simplify the work of the programmer, who can use established, pre-tested code instead of having to write and test new code. The framework 600 also comprises a software execution environment 604, which provides a runtime and hosting environment in which applications are executed and which provides services such as security, memory management and exception handling. The framework 600 also comprises a binarizer 606, the function of which is expanded upon hereinafter, some extensibility support tools 611 and a set of native senslet libraries 612. For the end-application programmer, these parts of the framework 600 are sufficient for developing senslets if a senslet-enabled sensor node 200 is available to the programmer. System integrators (and in some examples end-application programmers) can make use of tools 611 and the native senslet libraries 612 to develop sensor nodes 200 which are capable of executing senslets. The native senslet libraries 612 contain native support functionality for handling senslets on a sensor node 200 and which are intended to be executed by the sensor node 200 itself (rather than being transmitted any executed on the gateway computing device 106). For example, the native senslet libraries 612 may comprise (i) low-level communication support for transmitting senslets to a gateway computing device 106 such as the mobile phone 300, (ii) support for advertising the presence of senslets on a sensor node, (iii) drivers for accessing basic sensors on a sensor node 200, and (iv) simple senslet communication support.

The senslet framework class library 602 includes software ("classes") for carrying out core senslet tasks such as (i) communicating with sensor nodes 200, which in this example takes place based on an event-based interface for querying and retrieving sensory data or via a service-based interface, (ii) enabling discovery and description of the senslets, and (iii) Graphical User Interface (GUI) support for senslets. Carrying out these tasks allows data which has been acquired by a sensor 210, 212 to be, for example, retrieved and displayed on the screen 302 of the mobile phone 300. In this example, the functionality is initially accessible from two classes which are called 'BasicSenslet' 607 and 'Senslet' 608 herein.

An example of the BasicSenslet class 607 written in C# code is structured as follows:
Public abstract class BasicSenslet

```
{
        Public abstract void Init ( );
        Public abstract void Run ( );
        Public abstract void Exit ( );
        Public virtual int
            SendData (byte [ ] rgData);
        Public event DataReceivedHandler
            OnDataReceived;
        Public event HomeDeviceLostHandler
            OnHomeDeviceLost;
}
```

The programmer creates a new senslet by writing a new class that is based on the "BasicSenslet" or "Senslet" class. The methods Init ( ), Run ( ) and Exit ( ) can serve as entry points for a hosting process to control the execution of a senslet. The programmer may then add application-specific code to this class.

The execution environment 604 is arranged to execute senslets. It may be remotely accessible from a gateway computing device 106 or provided on the gateway computing device 106 as a separate application. It may be provided as part of the complete framework 600, or independently from the other framework 600 components. It may also be available to programmers to allow testing of senslets and the like.

The execution environment 604 for executing senslets on a gateway computing device 106 such as the mobile phone 300 allows the application of security policies. A security policy could, for example, specify that a senslet may not allowed to access one or more of the gateway computing device's facilities. For example. The execution environment 604 may be arranged to prohibit access to the mobile phone's cellular network connection, perhaps to prevent unexpected cost in call charges to a user. Another example security policy could specify that a senslet is may not access the file system of the gateway computing device 106, or limit the computing resources available to the senslet so as to prevent a senslet from monopolizing, for example, a processor of the gateway computing device 106. Alternatively or additionally to protecting the gateway computing device, a security policy could specify, for example, that all data exchanged must be encrypted. The execution environment 604 in this example is also responsible for discovering senslets and handling the senslet downloading process.

For example, if the senslet has been downloaded onto the mobile phone 300, the execution process calls Init ( ) to signal to the senslet that the senslet has now been loaded and is ready to start. If the senslet programmer decides so, he or she can also make use of the Init ( ) method to notify a sensor node 200 which provided the senslet that the senslet execution on the mobile phone 300 is now about to start. The Run ( ) method contains the senslet application logic. The Exit ( ) method is called by the senslet execution environment 604 to notify the senslet that its execution has been externally stopped. This can happen, for example, if the user of the mobile phone 300 uses the user interface of the runtime and hosting environment to stop all running senslets. By receiving this signal, the senslet can stop its execution in a controlled manner.

In this example, the basic senslet class also comprises some low-level functions as follows. The SendData method and the ReceiveData event are low-level calls for sending and receiving data. SendData sends a number of bytes to the embedded system 100 which provided the senslet and the ReceiveData event is called whenever new data is received. SendData and ReceiveData are low-level calls that may be extended to higher level Application Programming Interfaces (APIs).

Alternatively or additionally, embedded systems 100 and gateway computing devices 106 hosting senslets may communicate using a service model for calling services provided by an embedded system 100 and thus exchanging data, as is set out in greater detail below.

The Senslet class 608 is similar to the BasicSenslet class 607 but additionally provides support for integrating Graphical User Interfaces (GUIs) into a senslet, e.g. buttons, scroll bars, icons and windows. Because senslets are executed on a device other than a sensor node 200, the senslets can exploit the GUI features or other capabilities of this gateway computing device 106 to display sensory data, for gathering user input as appropriate, for carrying out computations, for communicating data to a backend system making use of the communication interfaces of the hosting device, or in some other way. As a GUI (or other interface) is available, senslets may be event-driven, for example reacting to user inputs.

After the programmer has implemented a senslet (block 402) by making use of the classes in the senslet class libraries 602, the next step is to compile the senslet with a compiler associated to the high-level language used to program the senslet (block 404). In this example, C# is used as a high-level language for developing senslets and thus a C# compiler is executed to compile the application developed by the programmer.

After the senslet has been compiled, the next step is to utilize the binarizer 606 (block 406). The binarizer 606 in this example makes use of the fact that a modern high-level programming language has been used for developing embedded system applications. When writing programs in a modern high-level language such as Java and .NET-enabled languages, compilers not only create pure object code as a result of a compilation process, but also include extensions, for example further so called 'metadata' which describes the compiled code, for example providing information about classes and structuring.

Using a process called 'reflection', the binarizer 606 evaluates a compiled senslet and extracts metadata about the senslets. As will be familiar to the skilled person, reflection is a mechanism to access metadata in compiled software. As a result, the binarizer 606 generates a senslet description, which can be used, for example in a senslet discovery process to advertise the presence and the properties of a senslet.

By way of example, if a senslet programmer assigned a public key to an element called m_sensletDescriptor of the BasicSenslet class, the BasicSenslet could be adapted by the programmer as follows in order to integrate the provided public key:

```
Public class MySenslet : BasicSenslet {
    Public void Init( ) {
        m_sensletDescriptor.publicKey = 0x12.....454;
    }
    ...
}
```

When the binarizer 606 runs, it extracts the public key using reflection.

In the same way, other properties of a senslet can be indicated directly by the application programmer. The senslet binarizer 606 uses reflection to extract these values and to create a senslet description as a separate file. In this example, the senslet description file is an XML file containing the properties of all the senslets processed by the binarizer 606. In this example, the binarizer 606 generates native code header files that contain a binarized version of the compiled senslet and of the senslet description (block 408). In the example of a TinyOS node 200, the binarizer 606 generates nesC header files containing a binarized version of the senslets including of the extracted senslet description. The senslet description is later used in the process of discovering senslets on sensor nodes 200 to allow a gateway computing device 106 to obtain information about the senslets hosted on a sensor node 200 without needing to download a senslet.

The compiled senslet and the senslet description are then stored as a senslet assembly on a sensor node 200. More generally speaking, an embedded system application assembly is stored on an embedded system 100. There are a variety of ways to achieve this. In one example, a sensor node 200 is equipped with a separate flash memory chip. This is sometimes the case on sensor nodes 200 which store large amounts of sensory data. In such an example, the support tools 611 comprise a tool for storing the senslet assembly in external flash memory. In another example, the senslet assembly is stored in RAM (for example if a sensor node 200 has an insufficient amount of flash memory). As on some known sensor nodes 200, the program flash memory on the sensor node's microcontroller 202 may provide the only place that provides sufficient memory for storing senslets.

In this example where senslets are stored in the flash memory of the microcontroller, the native sensor node application is recompiled including the generated nesC header files in the compilation process (block 410). Over a linking process which includes accessing the native senslet libraries 612, an embedded system 'image' is created. This embedded system image can be uploaded to the sensor node 200 (block 412). An image is the byte sequence that is written to the microcontroller 202 on the sensor node 200 which specifies where which bytes are stored on that specific microcontroller 202. The image includes the result of the compilation process and of the linking and may be given in a specific format (e.g., a hex file) for a specific microcontroller 202.

In the above examples, an end-application programmer developed embedded system applications for highly resource-constrained devices in a high-level language. The application programmer used only managed code to write an embedded system application and did not have to deal with native embedded system programming for resource-constrained platforms as it utilized native senslet libraries 612 to deal with low-level senslet support. The sensor node 200 contained a senslet assembly which is intended to be transmitted to and executed on a more powerful computing device. The sensor node 200 also contains native senslet support as provided by the senslet libraries 612 that handle low-level senslet tasks (e.g., discovery and communication and sensor access) on the sensor node 200 in native code.

In some examples, the framework 600 may be extensible, which may allow it to be used with a potentially unlimited variety of embedded systems 100. System integrators (i.e. a person or entity which develops a new embedded system 100 or extends an existing embedded system 100) may take advantage of the framework extensibility. Given the example of a sensor node 200 that is running TinyOS as an operating system, a range of functionalities could be provided. Additional functionalities may fall into two classes:

(i) new hardware on sensor nodes, which was not initially foreseen. For example, sensor nodes 200 may be designed with customizable hardware, e.g. new sensors or IO interfaces can be added.

(ii) new services related to the proposed use of the sensor node 200 (e.g. new uses or processing of sensor data).

The framework provider will not be able to know in advance what functionality may be required for existing/future sensor nodes 200 and therefore will not support every possible function that could be carried out. For example, the native senslet libraries 612 and the senslet class libraries 602 might contain the functionality for accessing temperature sensors, but not for accessing light sensors. Additionally, the framework provider will not be able to provide a priori every possible processing requirement for data retrieved from a sensor node 200. The framework provider can however respond to requests for the code and can enter the necessary code into the framework 600.

By way of example, a healthcare application provider may develop a new sensor node for tracking the medical condition of patients after surgery by tracking their activity level. The system integrator adds an accelerometer to an existing sensor node for measuring the activity level of patients. The system integrator also might add native algorithms to the sensor node 200 that derive the activity level of patients based on accelerometer readings. Once such a sensor node has been developed, the system integrator may wish to ensure that the functionality can be readily utilized. One way to do this is by integrating new native functionality as implemented by the system integrator into the senslet framework 600. A process for achieving this is described below with reference to the sensor node 200 of FIG. 2 and the flow diagram of FIG. 5.

In this example, a system integrator develops a new sensor node 200 which is able to switch on and off its LED 216 (block 502). In order for this function to be executed by a senslet, the framework 600 is extended to include a new class as part of the senslet class libraries 602 and native support for exposing the LED functionality to remotely executed senslets as follows.

The system integrator introduces metadata into the operating system or adds metadata to other pieces of native code (block 504). As nesC is used for programming in this example, metadata is indicated by the '@' sign. Metadata is inserted into native code, which is recompiled (block 506). Triggered by this recompilation, the extensibility support tools 611 analyze the metadata provided in native code and generate a new native service that is exposed by the sensor node 200. This new service may then be used by a senslet when it is executed on a gateway computing device 106 to make use of the new sensor node functionality. In order to allow end application programmers to access this functionality from native code, a new C# class that extends the senslet class library 602 is also created. In this example, the name of the new service is "Leds".

As an example, the LED functionality in TinyOS is now discussed in more detail. The Leds interface in TinyOS is as follows:

```
interface Leds {
    async command result_t init( );
    async command result_t redOn( );
    async command result_t redOff( );
    ...
}
```

If it is assumed that the initial senslet framework 600 did not expose this LED functionality, a system integrator may add metadata to this interface. The metadata @service and @operation in the following example specify which functions ought to be exposed as a service and be made accessible for senslet programmers:

```
interface Leds
@service(.name="Leds") {
    async command result_t init( );
    async command result_t redOn( ) @operation;
    async command result_t redOff( ) @operation;
    ...
}
```

When the native code (and, in this example, the OS as the Leds interface is part of the TinyOS operating system implementation) is recompiled, a corresponding service description is generated (block 508). This is carried out by the extensibility support tools 611. Specifically, the nesC compiler generates an XML file containing information about metadata. The extensibility support tools 611 have a tool that parses this XML file, analyzes the metadata tags added by the system integrator to the native code, and generates a service description out of this. This service description can be sent to or retrieved by other systems. The tools 611 generate service code from the metadata that exposes the operations redOn( ) and redOff( ) as a native service on the sensor node 200. Service models such as Web Services, Microsoft's Decentralized Software Services (DSS) or other lightweight service models may be used to describe how data are represented and exchanged between devices. A senslet running on a gateway computing device 106 may make use of these services. In the example above, the OS is TinyOS, but other in examples, metadata data may be added to a different OS or to sensor code that does not use an OS.

Given the generated service description, the extensibility support tools 611 included in the senslet framework 600 can generate a new class for the senslet class library (block 510). This generated code is typically referred to as a 'stub' by those skilled in the art. In this example, the service description might use the Web Service Description Language (WSDL) for describing the service and for generating the stubs. However, senslets may use other protocols for interacting with the native services provided by a sensor node 200, possibly using more lightweight protocols.

In this example, a lightweight service grounding is used within the stubs to communicate with sensor nodes 200 in order to reduce the communication overhead when interacting with sensor nodes 200. As will be familiar to the skilled person, a 'service grounding' provides a specification of service access information, building on WSDL by defining a message structure and a physical binding layer and specifying communication protocols, transport mechanisms, agent communication languages, and the like. A 'lightweight' service grounding has modest resource requirements. Sensor nodes typically do not support Simple Object Access Protocol (SOAP) or XML parsers, which may be required by non-lightweight services.

The generated public class Leds on/off program for turning the red LED 216 on and off in this example takes the form:

```
public class Leds {
    public int redOn( );
    public int redOff( );
    ...
}
```

This class is then inserted into the framework 600 as Leds 610 (block 512), as is shown in FIG. 7. A senslet programmer can use this class 610 in applications using C# and the senslet class library to call native functionality (i.e., in this example, functionality of the LED 216) on the sensor node 200 from a senslet application, as is now described with reference to the flow diagram of FIG. 8.

First, the programmer writes a senslet for a sensor node 200, and in this example, the Run( ) method of the senslet contains a reference to an object of the Leds class 610, generated as described above and arranged to switch on the red LED (block 802):

leds=new Leds( ); leds.redOn( )

The Run( ) method of a senslet is called by the execution environment 604 after the senslet's Init( ) method has been successfully completed. Therefore, including reference to an object of the Leds class 610 with the Run( ) method allows the senslet programmer to make use of the generated class and to call the method redOn( ), which in turn allows the programmer to transparently access the LED functionality on the sensor node 200. When the senslet is executed on a gateway computing device 106, it will call (new Leds( ).redOn( )), which will switch on the red LED 216 on the sensor node 200.

This new senslet is collected together with any other senslets to be stored on the sensor node 200 (block 804), and these are processed by the programmer using the binarizer 606 (block 806). The binarizer 606 uses reflection to identify all the senslets and extracts the properties from all of these senslets. Given the extracted properties, the binarizer 606 generates the senslet discovery descriptor and includes it with the senslets in an assembly (block 808). Once the assembly has been installed on a sensor node 200, the sensor node 200 may advertise the presence of senslets by exchanging the discovery descriptor with other devices, as is explained in greater detail below.

The senslet assembly including the generated discovery descriptor is stored on a sensor node 200 as described above (block 810). Therefore, the programmer writes code in nesC, compiles and links the program, and transforms it into a file that can be deployed on a sensor node 200, using binarizer 606 to embed the assembly into a nesC header file.

The generated nesC header files are included in the compilation process of the application normally running on the sensor node 200 (block 812). When recompiling the original application, the senslet assembly is therefore included in an image that is deployed on the sensor node 200. While it is possible to access services on a sensor node 200 using the runtime environment 604 which may be accessed by the browser on the mobile phone 300, the services on the sensor node 200 are provided in native code by the system integrator. As can be appreciated from the foregoing, when the system integrator flags the OS interface with metadata, the functionality of this interface may be automatically provided as a service. By use of the extensibility support tools 611, there is relatively little overhead in running a function as a service for the system integrator. The service is implemented in native code on the sensor node 200. The senslet in this example contains the stubs for calling the service. When a senslet is transmitted to a gateway computing device 106 such as a mobile phone 300, the stubs are used from within the execution environment 604 available on the mobile phone 300 to call the services on the sensor node 200.

Service descriptions may contain a specification of the functional interfaces of services provided by a sensor node 200. If a sensor node 200 exposes a description of its services, these functional interfaces can be used to dynamically generate code in the framework 600 and for generating new classes. In such examples, rather than flagging an interface with the addition of metadata, generating a service description therefrom, and using the service description to generate a class which calls the service remotely, the process can be automated. This may comprise querying a sensor node 200 for the services it provides. The sensor node 200 may return a set of service descriptions, which can be utilized as above to generate the corresponding classes for the framework 600.

The process of utilizing a senslet is now briefly described with reference to the flow diagram of FIG. 9. Before a senslet is downloaded from a sensor node 200, the mobile phone 300 may search for available senslets (block 902). In other examples, a sensor node 200 may search for execution environments, senslets may already be known to gateway computing devices 106, or may become known to gateway computing devices 106 in some other way. The sensor node 200 returns a description of the senslets—including a name, a human-readable description, and specific properties (block 904). In this example, this information is available without requiring download of the senslet. The screen 302 displays the list of senslets and the user therefore can choose to execute one or more of these. If the user chooses to execute a senslet, a request for that senslet is sent to the sensor node 200 (block 906). The sensor node 200 returns the senslet (block 908), which is then executed within the browser providing access to an execution environment 604 which is available on the mobile phone 300 (block 910). A more detailed description of the execution of senslets may be found in a co-pending patent application Ser. No. 12/146,882, entitled "Execution of Embedded Systems Applications", which is incorporated herein by reference.

FIG. 10 illustrates various components of an exemplary computing-based device 1000 which may be implemented as any form of a computing and/or electronic device, and in which embodiments of a gateway computing device 106, a programming computing device 104 or a backend computing device may be implemented.

The computing-based device 1000 comprises one or more inputs 1004 which are of any suitable type for receiving inputs such as an input from a sensor node 200 or another embedded system 100. The device 1000 also comprises a communication interface 1008 for communicating with other entities such as other communications network nodes, gateway computers or backend systems.

Computing-based device 1000 also comprises one or more processors 1001 which may be microprocessors, controllers or any other suitable type of processors for processing computing executable instructions to control the operation of the device in order to carry out the functions required to carry out the functions of a gateway computer or a backend device. Platform software comprising an operating system 1002 or any other suitable platform software may be provided at the computing-based device to enable application software 1005, which may include software arranged to provide the framework 600 and/or the execution environment 604 to be executed on the device 1000.

The computer executable instructions may be provided using any computer-readable media, such as memory 1003. The memory is of any suitable type such as random information memory (RAM), a disk storage device of any type such as a magnetic or optical storage device, a hard disk drive, or a CD, DVD or other disc drive. Flash memory, EPROM or EEPROM may also be used.

An output 1007 may also be provided such as an audio and/or video output to a display system integral with or in communication with the computing-based device 1000. The display system may provide a graphical user interface, or other user interface 1006 of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of programming embedded system applications in a high-level language comprising:
    under control of one or more processors configured with executable instructions:
    accessing a framework comprising class libraries including at least one class;
    utilizing at least one class to build an embedded system application assembly to be stored on an embedded system, wherein building the embedded system application assembly comprises generating at least one embedded system application and extracting a description of properties of the application using a tool provided in the framework, and wherein the description of the properties of the application being generated by a binarizer;
    identifying an embedded system functionality in native code, the native code being a low level language on the embedded system;
    requesting a new class in the high-level language to be provided in the framework, the new class allowing the embedded system functionality to be utilized;
    generating the new class in the high-level language independent of the native code; and
    inserting the new class into the framework.

2. A method according to claim 1, in which the requesting the new class comprises:
    entering metadata into native code blocks for the embedded system; and
    recompiling the native code blocks.

3. A method according to claim 1, further comprising:
    identifying an embedded system functionality of the embedded system;
    requesting a new service to be exposed on the embedded system; and
    generating the new service so that it is provided by the embedded system.

4. A framework for programming embedded systems, the framework comprising:
    one or more processors:
    memory, communicatively coupled to the one or more processors:
    at least one class library stored in the memory and executed by the processor, the class library comprising at least one class for building an embedded system application assembly, wherein:
    a binarizer arranged to generate a description of properties of the embedded system application and to transform the descriptions and the embedded system application assemblies to be suitable stored on an embedded system;
    the embedded system application assembly is arranged to be stored on an embedded system;
    the embedded system application assembly is arranged to be transmitted from the embedded system to a separate computing device for execution on the separate computing device; and
    the at least one class for building the embedded system application is in a high-level language and does not include a low-level language.

5. A framework according to claim 4 which further comprises a runtime environment for execution of embedded system applications.

6. A framework according to claim 5 in which the runtime environment is located on a gateway or a backend computing device.

7. A framework according to claim 4, the framework being configured to transmit data to and from the embedded system.

8. A framework according to claim 4 which further comprises extensibility support tools arranged to support the extension of the framework to include classes corresponding to at least one of: functions of embedded systems or methods of processing data retrieved from embedded systems.

9. A method of supporting programming of embedded systems comprising:
    providing a framework, wherein the framework comprises at least one class library, at least one class, and a runtime environment for executing embedded systems applications;
    receiving at least one request for a new class relating to an embedded system function, wherein the embedded system function is in a low-level language, wherein the at least one request for a new class includes receiving a request generated from metadata to insert metadata into the native code or operating system of an embedded system;

generating a service descriptor from the metadata, wherein the service descriptor comprises a Web Service Description Language (WSDL) description;

generating the new class from the WSDL description, wherein the new class is in a high-level language based at least in part on the received request, and the new class does not include the low-level language; and inserting the new class in the framework.

10. A method according to claim 9 in which the framework comprises a binarizer which is arranged to generate a description of an embedded system application.

11. A method according to claim 9, which further comprises providing a license to access the framework.

12. A method according to claim 9, which further comprises providing the framework as a software component.

13. A method according to claim 9, wherein the framework further comprises a system integrator including an entity under control of one or more processors to identify the embedded system function related to the requested new class.

* * * * *